Sept. 11, 1962     R. N. LILLEBERG     3,053,063
ABRADING DISC MOUNT
Filed Aug. 3, 1960

Inventor
Richard N. Lilleberg

Attorneys.

United States Patent Office 3,053,063
Patented Sept. 11, 1962

3,053,063
ABRADING DISC MOUNT
Richard N. Lilleberg, Chicago, Ill., assignor to The Flexan Corporation, a corporation of Illinois
Filed Aug. 3, 1960, Ser. No. 47,187
7 Claims. (Cl. 64—11)

This invention relates to an improved rubbing tool and more particularly to a grinding, sanding or a polishing tool for use on plane surfaces which has a joint capable of absorbing radial distortions while transmitting rotational force.

Rotatable rubbing tools designed for use on planar surfaces are often difficult to handle since the rubbing surface must generally be kept parallel to the surface of the work. Slight deviations result in traveling of the tool which causes gouging, unsightly marks and the like.

The tool described in this invention overcomes these problems because the joint automatically compensates for any angular deviation of the tool, thus absorbing radial distortions while transmitting rotational force. The improved joint of this invention is automatically self-aligning and requires no adjustment.

Therefore it is an object of this invention to provide a rubbing tool adapted for use on plane surfaces which overcomes the problem set forth above.

It is yet another object of this invention to provide an improved rubbing tool adapted for use on a plane surface comprising a rotatable portion having a planar rubbing surface and means for applying a rotational force to said portion including a joint capable of absorbing radial distortion while transmitting rotational force comprising an opening in said rotatable portion, a driven member having an enlarged portion, a sheath of material at least partly surrounding said enlarged portion and bonded thereto and an arcuate rib of resilient material having its inner edge connected to said sheath and its outer edge connected to said rotatable portion.

It is still another object of this invention to provide an improved joint comprising a driving member having an enlarged portion, a layer of resilient material bonded to the driving member and an annular resilient rib integral with said layer.

Other objects and advantages of this invention will become apparent from the following description taken together with the accompanying drawings.

Figure 1:
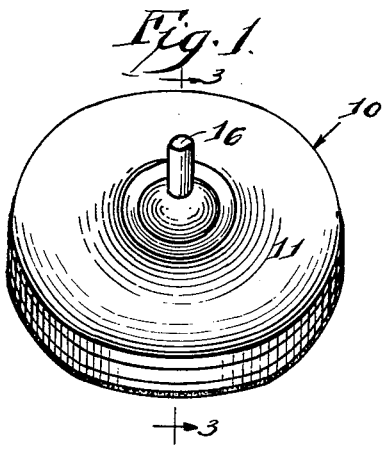
Figure 2:
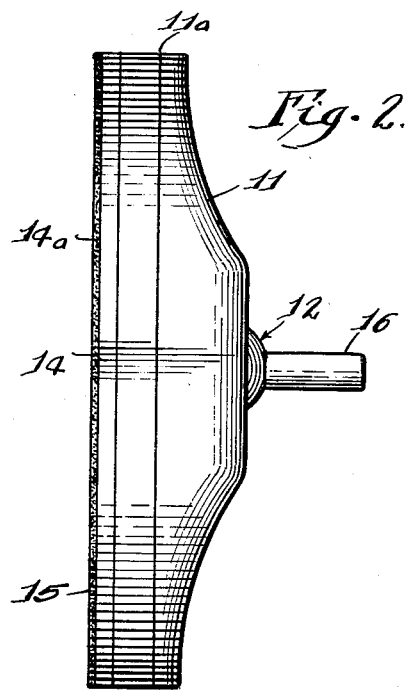
Figure 4:
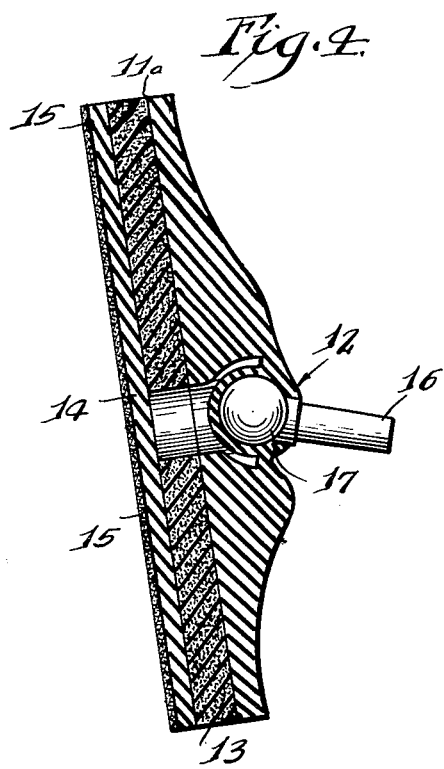
Figure 3:
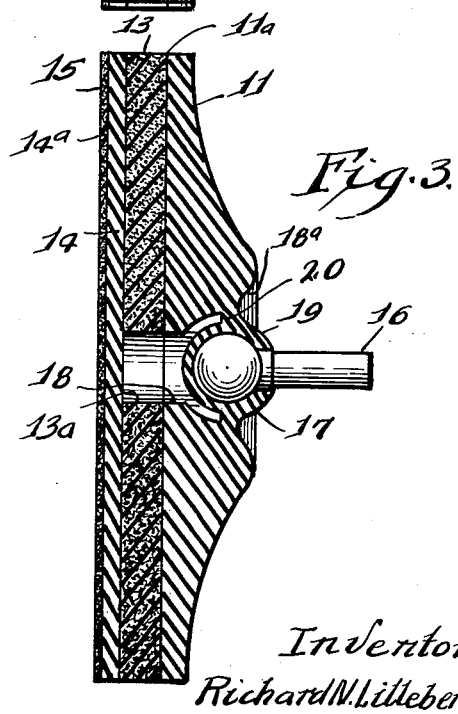

Of the drawings:
FIGURE 1 is a perspective view of the rubbing tool of this invention;
FIGURE 2 is a side elevation view showing a portion of the joint in dotted lines;
FIGURE 3 is a sectional view taken along line 3—3 of FIGURE 1; and
FIGURE 4 is a view similar to FIGURE 3 showing the joint radially distorted.

The rubbing tool 10 of this invention includes a disc-shaped member 11 constructed of any reasonably rigid material such as rubber. Attached to the disc is a joint 12 through which rotational force is supplied to the rubbing tool.

The face 11a of disc 11 is coated with a pressure sensitive adhesive of the type which commonly has the property under normal atmospheric conditions of being tacky and capable of adhesion merely by the application of slight pressure. A pad 13 composed of a resilient cellular material such as foam rubber is adhered to the face 11a by means of the pressure sensitive adhesive. Another rubber disc 14 which has a fibrous material embedded therein is permanently attached to the pad 13. The face 14a of the disc 14 is also coated with a pressure sensitive adhesive similar to the one previously decribed.

An abrasive disc 15 is attached to the disc 14 by means of the above mentioned adhesive. This sheet may be of any abrasive material such as sand paper or emery cloth, a polishing sheet or any other material commonly used in sanding, finishing and polishing operations.

The joint 12 delivers rotational force to the tool. This joint includes a generally cylindrically shaped shaft 16 which has a ball-shaped end 17 and which is adapted to be attached to a rotational power source such as any conventional drill or motor (not shown). The disc 11 has a cylindrically-shaped opening 18 which runs along the axis of rotation of the disc as does the pad 13 at 13a. The opening 18 increases in diameter as at 18a at its upper part. The end 17 of the shaft 16 is designed to be located in the upper part 18a of the opening 18. The end 17 is surrounded by a sheath 19 of resilient material which is bonded thereto. A concentric rib 20 which normally is part of the sheath 19 is attached to or molded as part of the disc 11 and effects a connection between the shaft 16 and the disc 11.

The resilient sheath 19 and the rib 20 may be made of any of the thermosetting elastomers such as natural or synthetic rubber. The inner surface of sheath 19 is bonded to the surface of the ball-shaped end 17. Any of the general methods in use for bonding rubber and other elastomeric materials to metals may be employed.

In the operation of the tool 10 of this invention, it is not necessary or critical to maintain the rubbing surface 15 absolutely parallel to the surface which is being worked. Should the operator fail to maintain this parallel relationship, the rib 20 which is deformable, automatically compensates for any misalignment (as shown in FIGURE 4), thereby causing the working surface 15 to remain parallel with the surface being worked.

Having thus described by invention as related to the embodiments shown in the accompanying drawings, it is my intention that the invention be not limited by any of the details of description unless otherwise specified, but rather be construed broadly within its spirit and scope as set out in the accompanying claims.

I claim:
1. A rubbing tool adapted for use on a plane surface comprising: a rotatable portion having a planar rubbing surface; and means for applying a rotational force to said portion including a joint capable of absorbing radial distortion while transmitting rotational force comprising, an opening in said rotatable portion; a driven member having an enlarged portion, said enlarged portion being positioned in said opening; a sheath of material at least partly surrounding said enlarged portion and bonded thereto; and an arcuate rib of resilient material having its inner edge connected to said sheath and its outer edge connected to said rotatable portion.

2. A rubbing tool adapted for use on a plane surface comprising: a rotatable portion having a substantially planar rubbing surface; and means for applying a rotational force to said portion including a joint capable of absorbing radial distortion while transmitting rotational force comprising, an opening in said rotatable portion; a driven member having a ball formed at one end, said ball being positioned in said opening; a sheath of material surrounding said ball and intimately bonded thereto; and an arcuate rib of resilient material having its inner edge connected to said sheath and its outer edge connected to said rotatable portion.

3. A rubbing tool adapted for use on a plane surface comprising: a rotatable disc having a substantially planar rubbing surface; and means for applying a rotational force to said disc including a joint capable of absorbing radial distortion while transmitting a rotational force comprising, an opening in said disc; a shaft having a ball formed at one end, said ball being positioned in said opening; a sheath of resilient material surrounding said ball and intimately bonded thereto, and a rib of resilient material surrounding said ball having its inner edge connected to said sheath and its outer edge connected to said rotatable disc.

4. A rubbing tool adapted for use on a plane surface comprising: a rotatable disc having a hollowed out center portion and a planar rubbing surface; and means for applying a rotational force to said disc including a joint capable of absorbing radial distortion while transmitting rotational force comprising, a driven member having one end adapted for connection to a rotational power source and a ball formed at the other end; said ball being spacially aligned within said hollowed out portion of said disc; a sheath of resilient material surrounding said ball and intimately bonded thereto and a rib of resilient material concentric with said ball, said rib integrally associated and interposed between said sheath and said rotatable disc.

5. A joint capable of absorbing radial distortion while transmitting rotational force comprising: a driven member having an enlarged portion at one end; a sheath of material at least partly surrounding said enlarged portion and bonded thereto, and an arcuate rib of resilient material having an edge connected to said sheath, the other edge of said rib being adapted for connection to a tool.

6. A joint capable of absorbing radial distortion while transmitting rotational force comprising: a driven member having one end adapted for connection to a rotational power source and a ball formed at the other end; a sheath of material surrounding said ball and intimately bonded thereto, and a rib of resilient material concentric with said ball having its inner edge connected to said sheath and its outer edge adapted for connection to a rotatable tool.

7. A joint capable of absorbing radial distortion while transmitting rotational force comprising: a driven member having one end adapted for connection to a rotational power source and a ball formed at the other end; a sheath of material surrounding said ball and intimately bonded thereto, and a rib of resilient material surrounding said ball having its inner edge connected to said sheath and its outer edge adapted for connection to a rotatable tool.

References Cited in the file of this patent
UNITED STATES PATENTS

| | | |
|---|---|---|
| 1,777,915 | Douglas | Oct. 7, 1930 |
| 1,940,884 | Rosenburg | Dec. 26, 1933 |
| 2,892,326 | Porter | June 30, 1959 |